Oct. 15, 1940.  C. R. PATON  2,217,965
CLUTCH CONTROL MECHANISM
Filed June 4, 1934   4 Sheets-Sheet 1
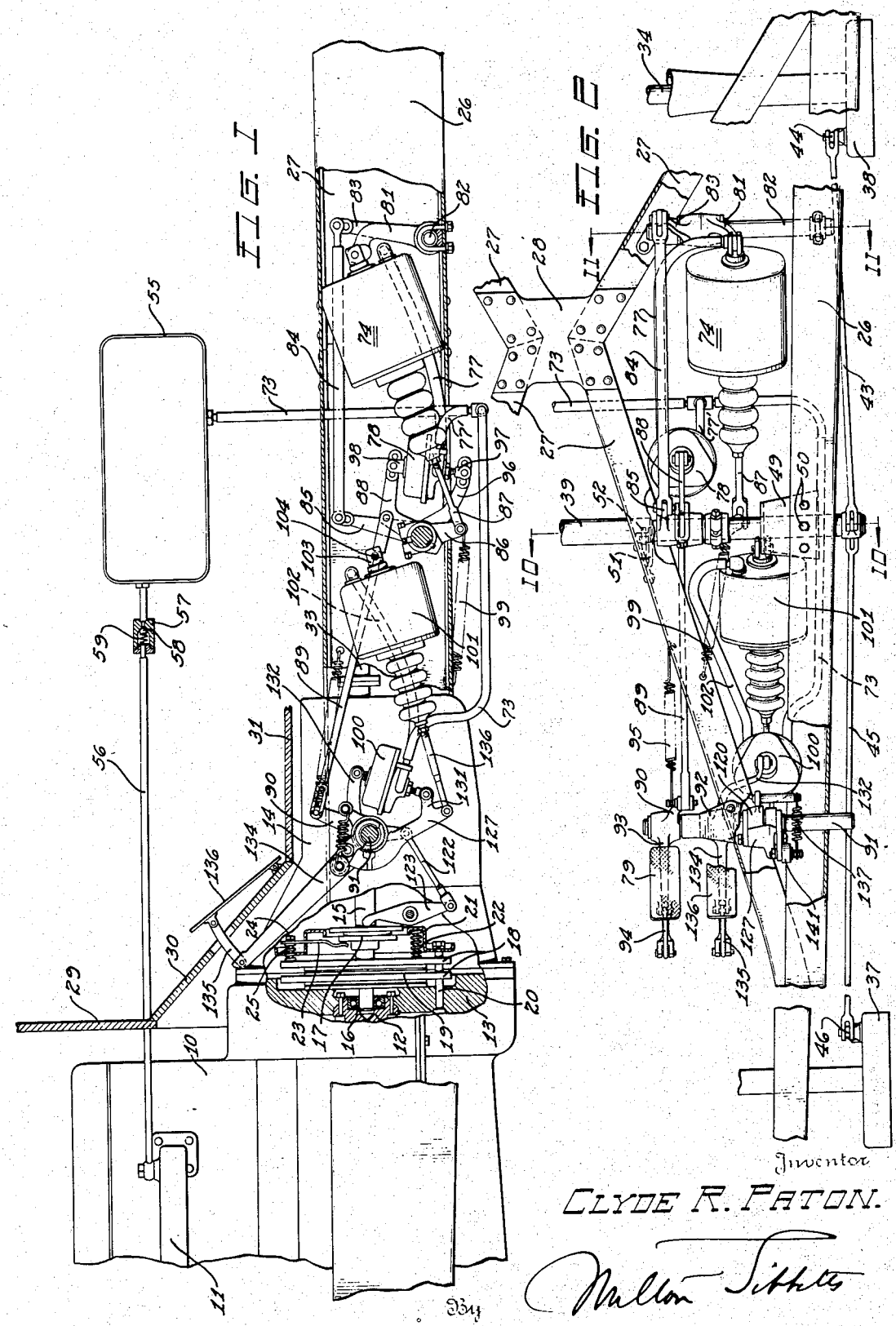
Inventor
CLYDE R. PATON.
By Mllon Sibbitts
Attorney Oct. 15, 1940.   C. R. PATON   2,217,965
CLUTCH CONTROL MECHANISM
Filed June 4, 1934   4 Sheets-Sheet 2
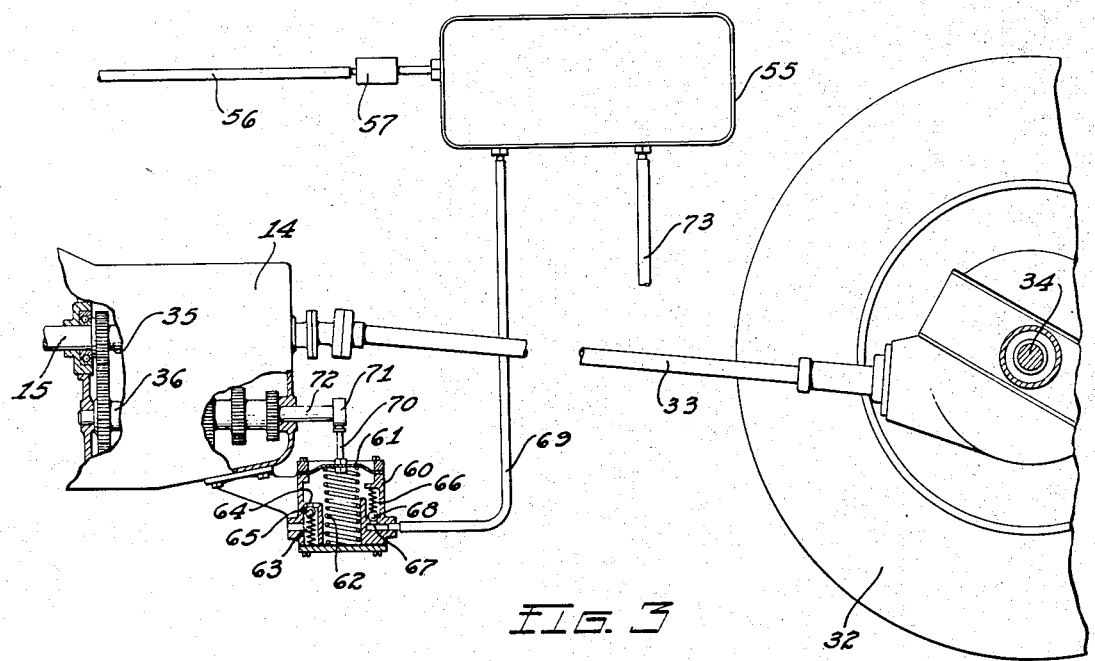
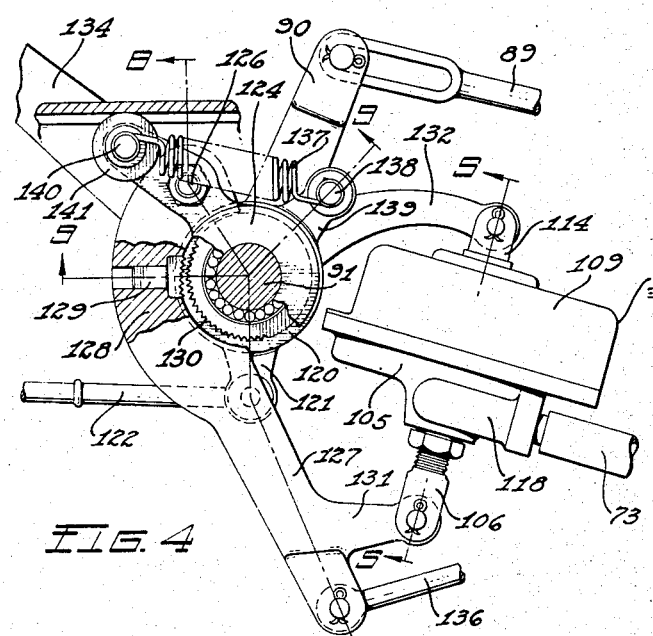
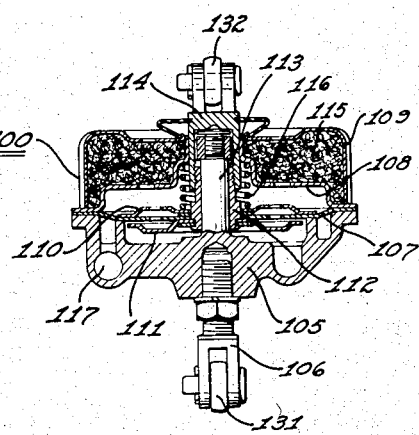
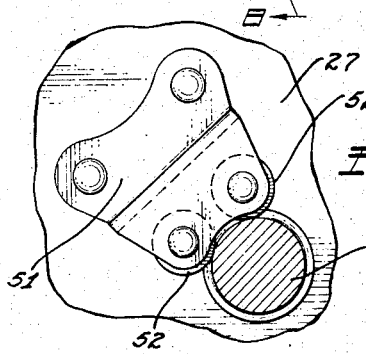
Inventor
CLYDE R. PATON.
By Milton Sibbets
Attorney Oct. 15, 1940.   C. R. PATON   2,217,965
CLUTCH CONTROL MECHANISM
Filed June 4, 1934   4 Sheets-Sheet 3
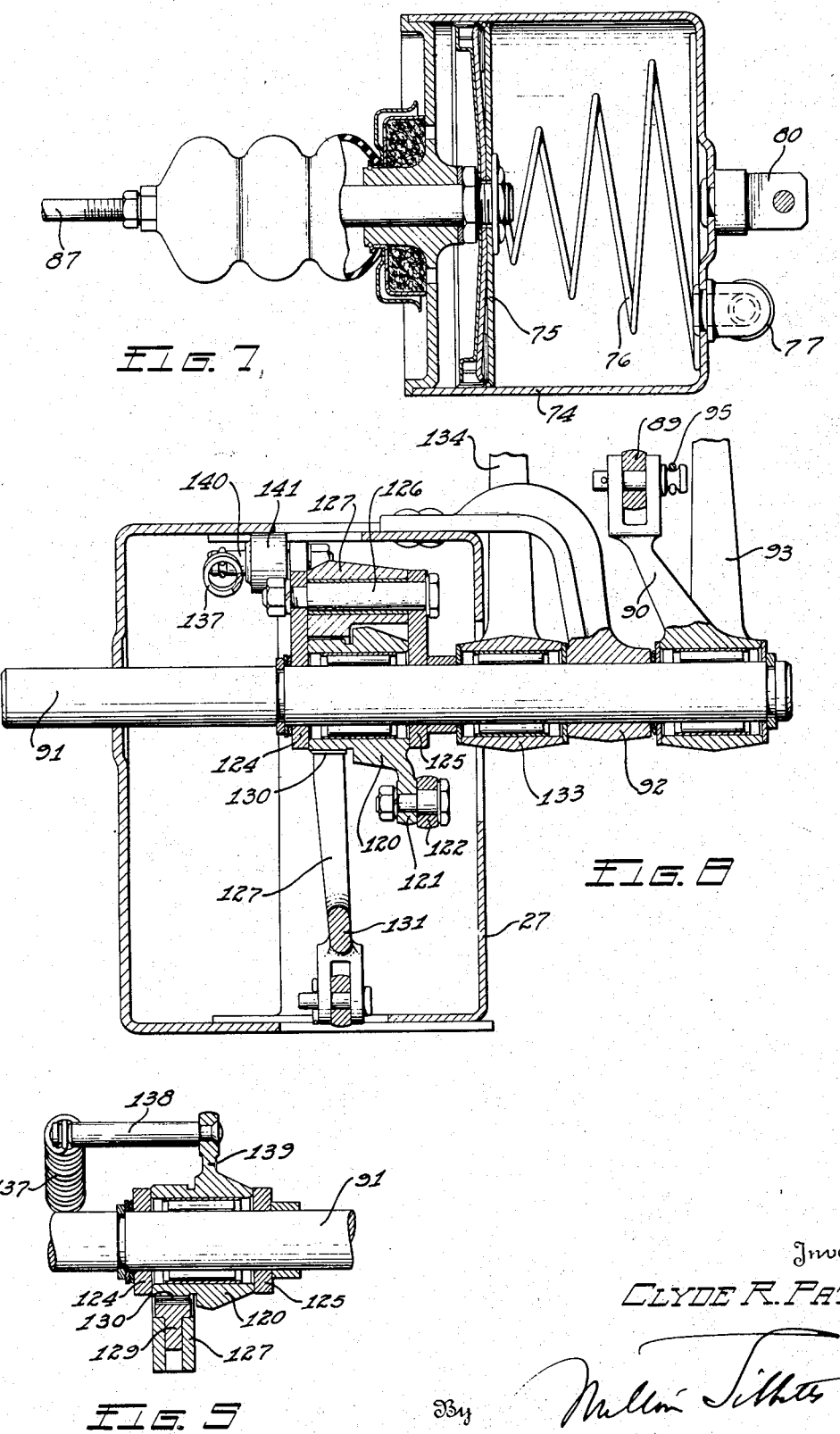

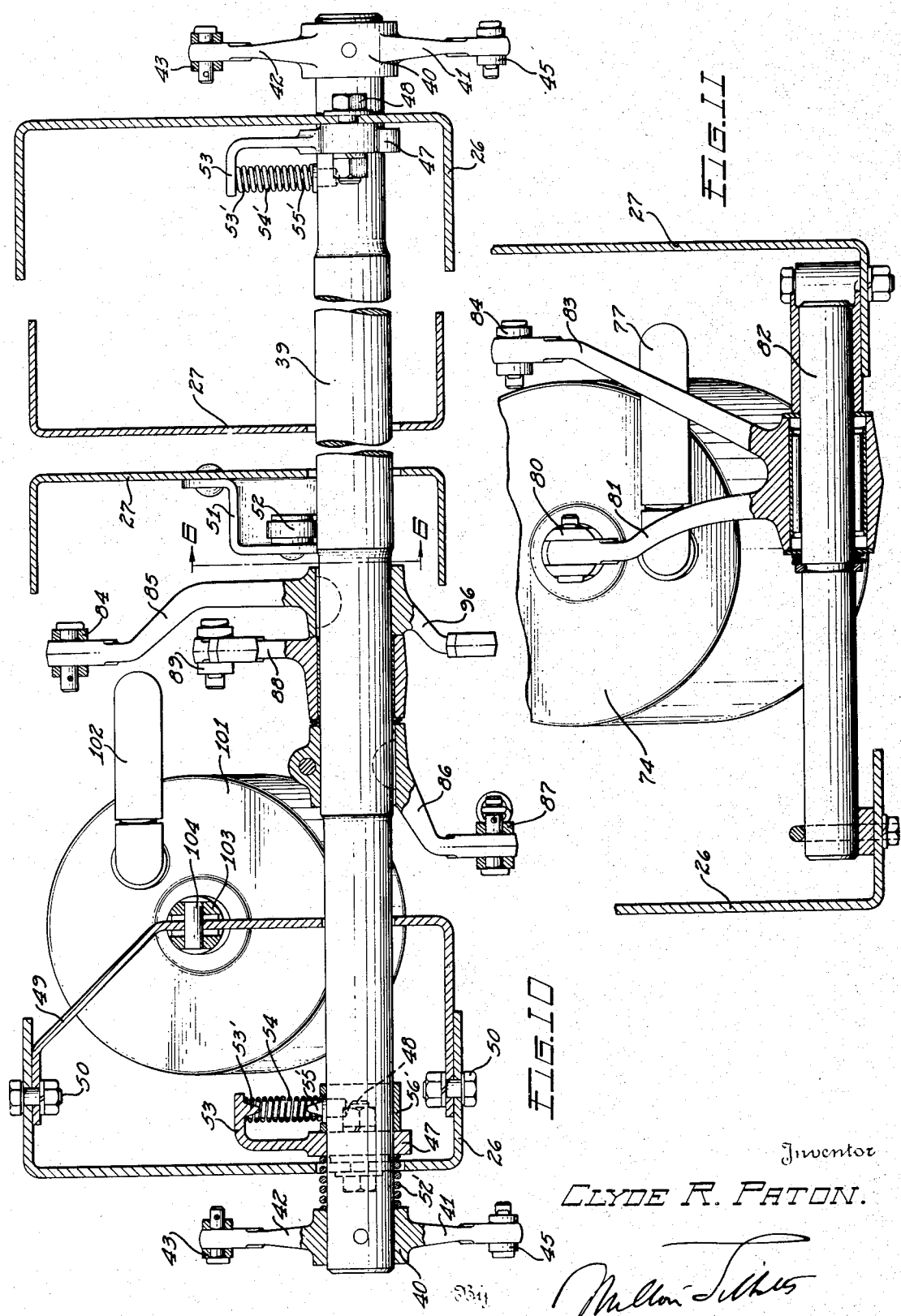

Patented Oct. 15, 1940

2,217,965

UNITED STATES PATENT OFFICE.

2,217,965

CLUTCH CONTROL MECHANISM

Clyde R. Paton, Birmingham, Mich., assignor to Packard Motor Car Company, Detroit, Mich., a corporation of Michigan Application June 4, 1934, Serial No. 728,920

10 Claims. (Cl. 192—91)

This invention relates to motor vehicles and more particularly to control mechanism.

An object of the invention is to reduce the manual effort now required in the operation of certain control mechanisms for motor vehicles.

Another object of the invention is to provide a simplified form of mechanism for furnishing power to operate a plurality of motor vehicle control devices.

A further object of the invention is to provide vacuum means for operating motor vehicle control devices which will be operative as long as the vehicle is moving irrespective of engine operation.

Still another object of the invention is to provide power means for operating the clutch and brakes of a motor vehicle which is compact and arranged substantially within the horizontal plane of the vehicle frame in order that the ground clearance of a chassis may be as desired.

Other objects of the invention will appear from the following description taken in connection with the drawings, which form a part of this specification, and in which:

Fig. 1 is a side elevational view of a portion of a motor vehicle chassis, partly broken away and partly in section, having my invention associated therewith;

Fig. 2 is a plan view of a portion of the same;

Fig. 3 is a diagrammatic view of a portion of a motor vehicle showing an auxiliary vacuum creating means;

Fig. 4 is a side elevational view, partly in section and partly broken away, showing a part of the clutch operating mechanism;

Fig. 5 is a sectional view, taken on line 5—5 of Fig. 4, illustrating a power control valve device;

Fig. 6 is a sectional view, taken on line 6—6 of Fig. 10, showing bearing means for the cross brake mechanism shaft;

Fig. 7 is a sectional view through the power cylinder for actuating the brake mechanism;

Fig. 8 is a sectional view taken on line 8—8 of Fig. 4;

Fig. 9 is another sectional view taken on line 9—9 of Fig. 4;

Fig. 10 is a sectional view taken on line 10—10 of Fig. 2;

Fig. 11 is a sectional view taken on line 11—11 of Fig. 2.

Referring now to the drawings by characters of reference, 10 indicates generally an internal combustion engine having the conventional fuel intake manifold 11 and crankshaft 12. On the rear end of the crankshaft is fixed a flywheel 13 and secured to the rear end of the engine is a transmission casing 14 having a drive shaft 15 therein. The forward end of the drive shaft is mounted in a bearing 16 seated in a recess in the rear end of the crankshaft and a clutch throw-out collar 17 is slidably mounted on the forward end of the drive shaft.

Between the clutch throw-out collar and the flywheel is a conventional clutch. Friction discs 19 are slidably keyed on the drive shaft 15 and are engaged in driving relation with the flywheel by axially movable pressure plates 18. A plurality of bolts, as indicated at 20, are anchored to the flywheel and pass through the axially movable pressure plates 18 and the rear clutch cover plate 21, suitable coil springs 22 being interposed between the rear plate 18 and the cover plate to normally maintain the movable clutch discs 19 in driving relation with the flywheel. A plurality of fingers, as indicated at 23, extend radially through the rear cover plate and pivot intermediate their ends against the plate. The inner ends of the fingers are in engagement with the throw-out collar 17 and the outer ends of the fingers are piloted on bolts 24 fixed to the rear clutch plate 18, springs 25 being interposed between the fingers and the clutch plate in a relation surrounding the bolts.

The engine is suitably mounted upon a frame having longitudinally extending channel side sills 26 and intermediate brace means consisting of angular members 27 secured together at their apex by plate means 28. It will be understood that the frame also has other brace means between the side sills usually employed to give rigidity throughout the length of the structure. The dash is indicated at 29, the toeboard at 30 and the floorboard at 31, such construction being conventional body design.

The frame is supported on wheels, as indicated at 32, and a propeller shaft 33 extends from the transmission casing to the drive axle, as indicated at 34, connected with the rear wheels. Within the transmission casing is a driven shaft 35 and a lay shaft 36, such shafts carrying the usual transmission gears for transmitting power from the drive shaft 15 to the propeller shaft 33. A further description of this transmission mechanism is not believed to be necessary as it is conventional with motor vehicles as shown and described in Patent 1,493,319, issued May 6, 1824 to Joseph Brodie.

Associated with the front wheels are brakes, one of which is indicated at 37, and associated with the rear wheels are brakes, one of which is indicated at 38. Intermediate the front and rear brakes, an operating shaft 39 extends transversely of the frame and is provided at each end with a hub 40 having oppositely extending arms 41 and 42 formed therewith. The arms 42 are connected by rods 43 with rear brake control means 44 while the arms 41 are connected by rods 45 with control means 46 for the front brakes. Rotation of the cross shaft 39 will oscillate the arms 41 and 42 and move the rods 43 and 45 to simultaneously apply and release the brakes.

The cross shaft is rotatably mounted in a pair of bearings 47 which are fixed one to each side sill by bolts 48. The shaft extends through openings in the brace members 27 and through an opening in a brace member 49 fixed to one of the side sills by bolts 50. Fixed to one of the brace members 27 is a bracket 51 carrying rollers 52 arranged to bear against the cross shaft and serving as a bearing for the central portion thereof. If the shaft should break at either end, the portion to which the operating mechanism is still connected will continue to function because such portion of the shaft will be supported by its bearing 47 and by the brace members 27, 49 and 52 depending upon where the shaft is broken and, under such circumstance, the brakes at the front and rear at one side of the vehicle will be operative.

An arm 53 projects upwardly and inwardly from each of the bearing members 47 and vibration absorbing coil springs 54 and 54' extend between the arms and the shaft 39. Anchor members 53' fixed to the arms project into the top of the spring coils while anchor members 55' are fixed to the shaft 39 and project into the bottom of the spring coils. A collar 56' surrounds the brake shaft and has an opening therein through which the anchor member 55' for the spring 54 projects. Coil spring 52' surrounds the brake shaft and bears against the bracket 47 and the hub 40 adjacent the spring 54. The shaft can move axially in its bearings a limited extent but such movement and vibration is opposed by the spring 52'.

With the brake operating shaft and the clutch throw-out collar I propose to associate a compact operating system which is actuated by manually controlled power means, the power means, however, being such that the manual control means can be utilized to operate the clutch and brakes.

In such system, there is a tank 55 which is connected with the manifold 11 by conduit means 56. Within this conduit means is interposed a valve housing 57 having a seat adapted to be closed by a one-way valve 58 normally held closed by the coil spring 59. This valve is held open while the engine is running due to the low pressure condition in the manifold 11. In Fig. 3, I have illustrated an auxiliary vacuum creating means which includes a pump housing 60 and a diaphragm pump 61 normally extended by a coil spring 62 within the housing. There is an air outlet chamber 63 within the housing having a port 64 normally closed by a one-way spring pressed valve 65. There is an air inlet chamber 66 having a port 67 normally closed by a one-way spring pressed valve 68. Connected with the inlet port 67 is a conduit 69 leading to the tank 55. Connected to the diaphragm is a rod 70 with which a driving cam 71 engages, such cam being fixed to an end 72 of the lay shaft 36 extending beyond the rear end of the transmission casing. When the engine is operating, suction in the intake manifold creates a partial vacuum in the tank 55. As long as the engine is operating with the main clutch engaged or while the vehicle is moving with the transmission mechanism in driving relation, the lay shaft extension 72 and cam will be rotated, and the cam together with the spring 62 will cause the diaphragm 61 to reciprocate and thereby create suction in the system. The valves 58 and 68 serve to close the tank from the vacuum creating means when they fail to produce sub-atmospheric pressure in the power system and consequently a low pressure condition will remain in the tank sufficient for effecting several power operations of the clutch releasing mechanism and the brake mechanism after the engine stops or when the vehicle progress ceases. It will thus be seen that a partial vacuum is produced in the system by connection with the manifold when the engine is running and that there is a positive auxiliary partial vacuum creating means associated with the system which is operative as long as the vehicle is moving with the transmission mechanism in driving relation. Under such conditions, the power means will be effective whenever the vehicle is moving with the transmission in driving relation or the engine is operating to apply the brakes and release the clutch through means of mechanism which will be hereinafter described. A power conduit 73 leads from the tank 55 to the mechanisms for disengaging the clutch and for operating the brakes.

The brake applying structure consists of a power cylinder 74 in which a piston 75 is mounted and normally held in brake release position by a coil spring 76. A conduit 77 connects one end of the cylinder with a control valve mechanism, indicated generally at 78, and a conduit 77' leads from the line 73 to the valve mechanism, such valve mechanism being regulated by mechanism under control of the brake pedal 79. The cylinder is provided with an extension 80 which is pivotally connected to a lever 81 pivotally mounted on a stub shaft 82 secured to one of the side sills 26 and the adjacent brace member 27, as best shown in Fig. 11. Arm 83 is formed integral with the lever 81 but extends at one side thereof where a forwardly extending rod 84 is pivoted to the free end thereof. The forward end of the rod is pivotally connected to an arm 85 which is keyed on the brake cross shaft 39. Another arm 86 is keyed on the brake cross shaft 39 and pivoted to the free end thereof is a rod 87 which is attached to the piston 75 within the cylinder 74. Loosely mounted on the cross shaft 39 between the arms 85 and 86 is an angular lever 88 to one end of which is pivoted a forwardly extending rod 89, such rod being pivoted at its other end to lever 90 rotatably mounted upon stub shaft 91 carried by one of the side sills and a bracket 92 fixed to the brace member 27. Formed integral with the arm 90 is another arm 93 pivoted at its forward end to a link 94 which extends through the toeboard and is pivoted to the treadle 79. A coil spring 95 is connected at one end to the pivot connecting the rod 89 with the arm 90 and is secured at its other end to the adjacent brace 27, such spring being of a character to normally exert a force which is sufficient to hold the treadle 79 in its uppermost position. Arm 96 is formed integral with the arm 85 and extends in an opposite direction relative thereto, such arm having a link 97 associated with the valve control mechanism and a similar link 98 is pivoted to the arm 88 and is associated with the valve control mechanism. A coil spring 99 is secured at one end to the pivot connecting the rod 87 with the arm 86 and at the other end to the adjacent frame sill 26, such spring being designed to exert a force which will return the brake mechanism to a position releasing the brakes when the manual or power operating means are ineffective.

The conduit 73 is also connected with another valve control device, designated generally at 100, which communicates with a power cylinder 101 through means of a conduit 102. This power cylinder is provided with an extension 103 which is pivotally carried by a pin 104 on the bracket 49. The valve control device consists of an end casting 105 to which is fixed a pin 106 and secured to this casting is a diaphragm valve 107, an inner cover plate 108 and an outer cover plate 109. Reinforcing plate members 110 and 111 are arranged on opposite sides of the diaphragm. The diaphragm and the plate members are secured to a hub 112 which is slidable axially on the stem 113 extending from the casting and secured to the hub is a pin 114 having an end bifurcated exteriorly of the outer cover. Between the inner and outer covers is arranged steel wool 115, or some similar material, and extending between the inner cover and the diaphragm is a coil spring 116. A duct 117 is formed in the end casting and is connected with the conduit 73 by a connection 118. The conduit 102 connects the rear end of the power cylinder 101 with the space between the end casting and the diaphragm so that when the diaphragm covers the outlet end of the duct, flow is cut off between the conduits 102 and 73 and the piston within the cylinder 101 is ineffective. When the valve is closed, the power line 102 is open to atmosphere through openings in the diaphragm, the reinforcing plates and the cover members. It will be understood that the construction of the piston and the mechanism within the cylinder 101 is similar to that of the brake power mechanism as shown in Fig. 7 except that the cylinder is anchored, and it is also to be understood that the valve control device 78 associated with the brake applying power mechanism is similar in detail to the valve device for controlling the clutch power means.

On the stub shaft 91 is freely mounted a hub member 120 having an arm 121 extending therefrom to which a rod 122 is pivotally mounted. This rod is also pivoted to a clutch throw-out lever 123 having a yoke at its upper end which straddles the shaft 15 and engages the throw-out collar 17. At each end of the hub 120 I arrange plate members 124 and 125 which are rotatably mounted on the stub shaft 91 and are secured together by a bolt 126 to form a carrier structure. Pivotally mounted on this bolt is an arm 127 having a curved portion 128, complementary to the hub member, carrying a pawl 129 with serrations similar and adapted to engage with serrations 130 formed on a portion of the peripheral surface of the hub 120. An arm 131 extends from the lever 127 and is pivoted to the pin 106 of the valve device and a rod 136 extending to the piston in the cylinder 101 is pivoted to the end of the lever. An arm 132 is pivoted at one end to the pin 114 of the valve device and is carried by a hub 133 from which also extends a lever 134. Link 135 is pivoted to the free end of the lever 134 and extends through an opening in the toeboard where it is pivoted to a foot treadle 136. A coil spring 137 is fixed at one end to a pin 138 mounted on an ear 139 on the hub 120 and is fixed at the other end to a pin 140 fixed to an extension 142 on the plate member 124. Roller 141 on the pin is located so that it will engage the top flange of the adjacent frame side sill and limit rotational movement of the members 124, 125 and the fulcrum of the arm 127 carried thereby.

As the spring is fixed to the hub 120, a force is always exerted to take up slack in the mechanism between the clutch throw-out collar and the arm 121 on the hub. The movement required by the pedal to drivingly engage the serrations on the pawl and on the hub can be regulated by adjustment of the pin 106 in the valve device casting, as the clearance between the serrations is thus regulated. The position of the hub is fixed in one direction by the roller and the spring 137 so that pivotal adjustment of the lever 127 by axial adjustment of the pin 106 will regulate serration clearance.

To disengage the clutch, the treadle 136 is pressed down and such motion is transferred to the lever 134 by the link 135. As the arm 132 is integral with the lever 134, it will be rocked upwardly moving the valve device 100 and the lever arm 131 therewith until the serrations on the pawl 129 engage the serrations 130 on the hub 120, the lever 127 swinging on its pivot 126. When the serrations become engaged in this manner, the rotation of the hub 120 is opposed by the clutch springs 22 because of the connection 122, the lever 123 and the throw-out collar 17 so that further pressure against the treadle will move the pin 114 and hub 112 axially of the stem 113 and lift the diaphragm 107 to open the duct 117 so that the conduits 73 and 102 are in communication whereupon vacuum in the system, developed in the manifold or by the pump, will move the piston in the cylinder 101 to the right. By means of the rod 136, such movement is transmitted to the lever 127 to automatically continue movement by power in the same direction as first instituted by treadle pressure so that the hub 120 will be rotated and operate the throw-out mechanism to disengage the clutch.

Upon release of foot pressure, the diaphragm will return to close the duct 117 thus cutting off the vacuum and making the power means ineffective. The clutch springs will then rotate the hub 120 in a clockwise direction, as viewed in Fig. 4, and will move the lever therewith until the pawl serrations become disengaged from the hub serrations. The spring 137 then comes into effect to swing the roller 141 against the foot board thus rotating the members 124 and 125 and the fulcrum of the lever 127 to position of rest. It will be understood that the treadle can be pushed down by foot to raise the valve device to a greater extent than required when the power device becomes effective and thus move the lever 127 while engaging the hub to disengage the clutch as previously described. The treadle position will remain constant as any slack in the mechanism will be compensated for due to the relation of the engaging means between the hub 120 and the lever 127. With this clutch operating structure, the movement of the throw-out collar 17 will be proportional to the treadle movement because the valve device is the connecting link between the treadle arm 132 and the arm 127 which is responsive to power and foot pressure.

It will be seen that the valve is opened to make the power device effective without requiring much foot pressure or pedal movement and thus little physical effort is required when the power means is utilized to disengage the clutch. There is enough pressure required by the driver so that he will be sensitive to valve closing reaction. The clutch operating mechanism, due to its design and mounting, is contained substantially in the horizontal plane of the frame and thus will not affect ground clearance in the vehicle design.

To apply the brakes, the treadle 79 is pressed down causing the link 94 to travel therewith and rock the lever 93 downwardly and the arm 90 forwardly. Such movement of the arm will move the rod 89 therewith which in turn will rock the lever 88 upwardly. Movement of the valve device 78 with the lever 88 is opposed by the spring forces holding the brake actuating mechanism in brake releasing position and therefore manual effort is only required to lift the diaphragm valve 107 in the brake valve device to establish open communication between the conduit 77' and the conduit 77. When such communication is established, vacuum will move the cylinder forwardly and the piston rearwardly, thus exerting two forces to turn the brake cross shaft. Because of such arrangement, a smaller cylinder can be utilized and the shaft operating mechanism can be arranged substantially in the horizontal plane of the frame. The piston movement carries the rod 87 therewith and rocks the shaft as the rod is pivoted to the arm 86 keyed on the shaft. Forward movement of the cylinder will rock the arms 81 and 83 forwardly and turn the brake shaft through means of the rod 84 and the arm 85 keyed to the shaft.

Release of pressure on the treadle releases the diaphragm in the valve device shutting off vacuum from the cylinder whereupon the spring 99 will return the brake shaft to normal brake release position. Spring 95 will then return and hold the treadle in its uppermost position, this being required as the lever 88 is loosely mounted on the brake shaft. It will be seen that, when the power means is ineffective, the brakes can be applied manually by manually applied force on the treadle 136 which is transmitted through lever 134, rod 89, lever 88, the valve device 78 and arm 96 to rotate the brake shaft.

The brake applying mechanism is relatively compact and can be located within the horizontal plane of the frame due mainly to the compound vacuum applied forces allowing the use of a small power cylinder. The brakes and the clutch are operated from a single power system which is controlled manually to selectively operate the desired mechanism. The system is such that vacuum will fail only when the engine has stopped and the vehicle is not moving or where the transmission mechanism is out of driving relation with the engine stopped.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. Clutch operating mechanism comprising a physically operable lever, a rotatably mounted member connected to control the clutch, an actuator lever, and a valve device connecting the physically operable lever means with the actuator lever, said actuator lever being engageable with said rotatably mounted member to rotate the same after a predetermined movement of the physically operable lever.

2. Clutch operating mechanism comprising a shaft, a pedal operated lever mounted on the shaft, a member rotatably mounted on the shaft and connected to control the clutch, an actuator lever adapted to be moved to engage and rock said rotatable member, and a valve device connecting the pedal operated lever in motion transfer relation with the actuator lever, said valve device being adjustable to regulate the clearance between the actuator lever and the member.

3. Clutch operating mechanism comprising a shaft, a physically operable lever pivoted on the shaft, a hub member rotatably mounted on the shaft, pivot carrying means rotatably mounted on the shaft, an extension on the pivot carrying means, an actuator lever mounted on the pivot carrying means and engageable to rock the hub member, a valve device connecting the physically operable lever with the actuator lever to transmit motion, clutch throw-out mechanism connected to be actuated by the hub member when rocked, and means connecting said hub member and said extension in a relation to take up slack in the clutch throw-out mechanism and to normally maintain the actuator lever in extreme ineffective position.

4. Clutch operating mechanism comprising a physically operable lever means, a rotatably mounted hub member connected to throw out the clutch, actuator lever means movable to engage and rock the hub member, a valve device connecting the actuator lever means and the physically operable lever means, and power means controlled by said valve device and connected to the actuator lever means, said actuator lever means being actuated physically through said valve device and said physically operable lever means or actuated by the power means to rock said hub member.

5. Clutch releasing mechanism comprising a frame, a shaft fixed to the frame, a serrated driven hub member loosely mounted on said shaft, a pair of plate members loosely mounted on said shaft one at each end of the hub member, a pin fixing the plate members together, an actuator lever pivotally mounted on the pin and having a serrated portion adapted to drivingly engage the serrated portion of the hub member, means for disengaging the clutch connected with said hub member, a manually rockable lever mounted on the shaft, a valve device connecting the rockable lever and the actuator lever, an extension on one of said plate members carrying a roller, said roller being located to engage the frame and limit rotation of the plate members in one direction, and a spring connected between one of the plate members and the hub member urging the roller in the direction of the frame.

6. Clutch operating mechanism comprising a shaft, a serrated hub rotatably mounted on the shaft, an arm fixed to the hub, means operated by the arm for disengaging the clutch, a second arm fixed to the hub, an angular lever rotatably mounted on the shaft, manually operable means connected to one end of the angular lever, a power valve device connected to the other end of the angular lever, a pair of plate members arranged one at each end of the hub and rotatably mounted on the shaft, a pivot member carried by the plate members, a lever mounted on the pivot and connected to the valve device, a pawl carried by the lever engageable with hub serrations, an extension on one of the plate members having a pin therein, a roller on the pin adapted to engage an abutment thereabove, a coil spring connecting the pin and the second arm on the hub, vacuum operated power means controlled by the valve device, and a connection between the power device and the pawl carrying lever.

7. Clutch releasing mechanism comprising a frame, a shaft fixed to the frame, a serrated driven hub member loosely mounted on said shaft, a pair of plate members loosely mounted on said shaft one at each end of the hub member, a pin fixing the plate members together, a driving lever pivotally mounted on the pin and having a serrated portion adapted to drivingly engage the serrated portion of the hub member, means for disengaging the clutch connected with said hub member, a manually rockable lever mounted on the shaft, and a valve device connecting the rockable lever and the driving lever, said valve device being adjustable to regulate the clearance between the serrations on the driver lever and the serrations on the hub member.

8. Shifting mechanism comprising a shaft, a pair of members rotatably mounted on said shaft, a lever pivoted on one of said members and swingable to drivingly engage and rock the other member, shifter means connected to be actuated by said rocked member, a physically operable lever, a power valve device connecting said physically operable lever and said first mentioned lever, power means connected with said first mentioned lever, said power means being controlled by said valve device as influenced by said physically operable lever, and means normally disengaging said first mentioned lever from driving engagement with said rotatably mounted member.

9. Shifting mechanism comprising a shaft, a pair of members rotatably mounted on said shaft, a lever pivoted on one of said members and swingable to drivingly engage and rock the other member, shifter means connected to be actuated by said rocked member, a physically operable lever, means connecting said physically operable lever and said first mentioned lever, and spring means associated with said rotatably mounted members for positioning them to normally maintain said shifter means in one extreme position and to disengage said first mentioned lever from the rotatable member which it rocks.

10. Shifting mechanism comprising a shaft, a pair of members rotatably mounted on said shaft, a lever pivoted on one of said members and swingable to drivingly engage and rock the other member, shaft means connected to be actuated by said rocked member, a physically operable lever, a power valve device connected with said physically operable lever, adjustable means connecting said pivoted lever with said power valve device, the adjustment of said connecting means varying the movement required for said pivoted lever to drivingly engage the member it is adapted to rock, power means connected with said first mentioned lever, said power means being controllable by said valve device as influenced by said physically operable lever, and means normally disengaging said first mentioned lever from driving engagement with said rotatably mounted member.

CLYDE R. PATON.